United States Patent [19]

Hafner

[11] 4,139,317
[45] Feb. 13, 1979

[54] BEARING LOCKING ASSEMBLY
[75] Inventor: Eugene R. Hafner, Carmel, Ind.
[73] Assignee: FMC Corporation, San Jose, Calif.
[21] Appl. No.: 839,142
[22] Filed: Oct. 3, 1977
[51] Int. Cl.² ............................................. F16B 2/18
[52] U.S. Cl. ..................................... 403/352; 308/236
[58] Field of Search ................. 403/DIG. 7, 350, 351, 403/352, 367; 308/236

[56] References Cited

U.S. PATENT DOCUMENTS

| | | | |
|---|---|---|---|
| 458,580 | 9/1891 | Irvin | 403/351 X |
| 1,485,621 | 3/1924 | Loeffler | 403/352 |
| 3,007,753 | 11/1961 | Potter | 403/351 X |
| 3,036,872 | 5/1962 | King, Jr. et al. | 308/236 |

FOREIGN PATENT DOCUMENTS 179227  5/1922  United Kingdom ...................... 403/350

*Primary Examiner*—Andrew V. Kundrat
*Attorney, Agent, or Firm*—J. W. Edwards; J. F. Verhoeven

[57] ABSTRACT

A bearing locking assembly has a sleeve that fastens an inner race ring of an anti-friction bearing of either a ball or roller design to a rotatable shaft. The sleeve is split longitudinally, enabling the sleeve to be compressed radially for slipping axially within a bore of the ring. Upon release of the compression, the sleeve expands in diameter so that a central portion of the sleeve keys the sleeve axially in place within the ring bore. The sleeve, with the ring mounted thereon, slips axially upon the shaft. External cylindrical surfaces at the end portions of the sleeve are eccentric, and internal cylindrical surfaces at the end portions of the ring bore are eccentric. Angular rotation of the ring relative to the sleeve causes engagement of the eccentric cylindrical surfaces to tighten the sleeve about the shaft, while the concentric portions of the sleeve and the ring maintain the ring centric relative to the shaft. The bore opening of the sleeve can be machined to receive various size shafts to adapt one size of bearing ring to any one of a variety of the shaft sizes.

6 Claims, 5 Drawing Figures

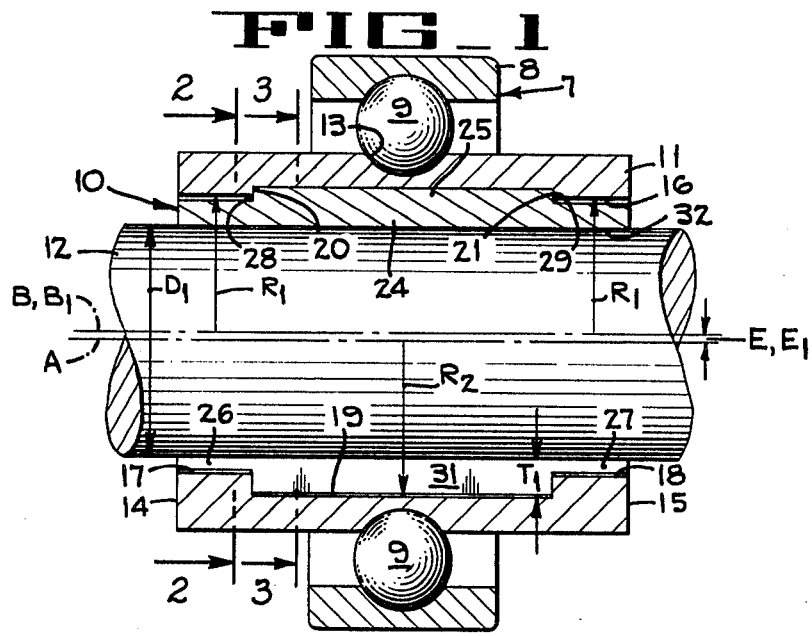
FIG_1
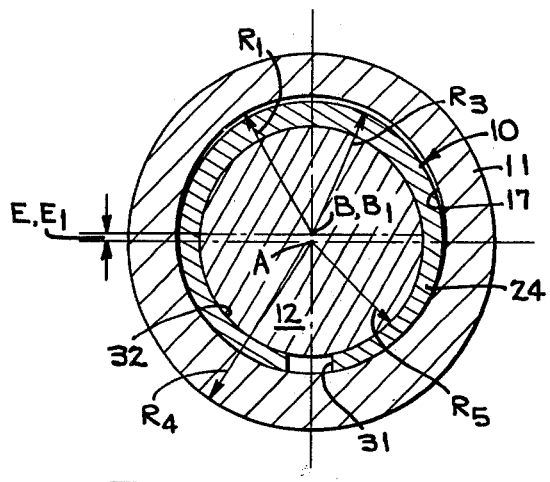
FIG_2
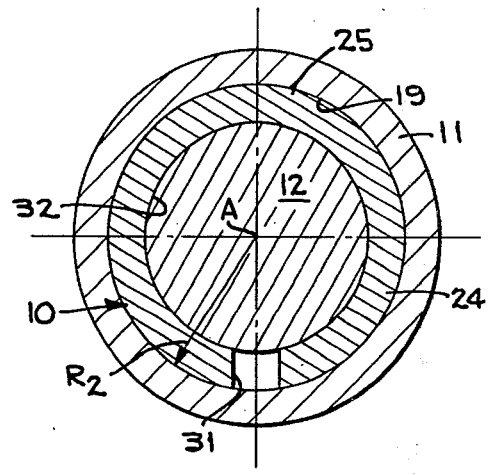
FIG_3
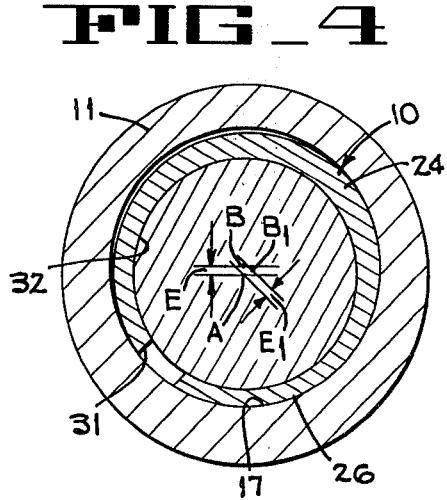
FIG_4
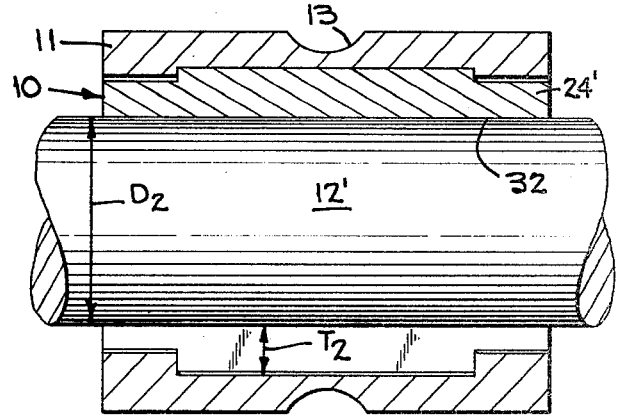
FIG_5

BEARING LOCKING ASSEMBLY

BACKGROUND OF THE INVENTION

1. Field of the Invention

This invention relates to an assembly for locking an annular machine element, such as an inner race ring of an anti-friction bearing, sleeve, sprocket, gear or the like, to a rotatable shaft. More specifically, the assembly includes a sleeve that slips axially into the bore of a bearing ring and a shaft that slips axially into a bore of a sleeve. Relative angular rotation between the bearing ring and the sleeve locks the sleeve upon the shaft.

2. Description of the Prior Art

The use of cam sleeves or segments, which fit within eccentric bore portions of inner race rings for anti-friction bearings to lock a ring upon a rotatable shaft, is shown in the U.S. Pat. Nos. of Miller, No. 2,038,121; Styri, No. 2,100,725; Potter, No. 3,700,753; Warda, No. 3,920,342. The U.S. Pat. No. 2,228,282 of Miller shows a tapered sleeve that is split longitudinally and which locks a bearing ring upon a shaft. The use of cam locking collars to fasten inner race rings of an anti-friction bearing to a rotatable shaft is shown in the U.S. Pat. Nos. of Searles, No. 1,650,573; Browne, No. 1,821,877; and Runge, No. 1,835,991. Locking collars concentrate pressure along a narrow band about the shaft. Such concentrated pressure results in fretting corrosion between the inner ring and the shaft. It is desirable to use a given size of bearing ring on a variety of shaft sizes. Thus, the bearing locking assembly should have the capability of mounting a common inner ring member upon various shafts with diameters in a given range.

SUMMARY OF THE INVENTION

The present invention reduces fretting corrosion by spreading over a wide area the locking pressure between bearing assembly elements. A longitudinally split sleeve has outside cylindrical surfaces machined to mate with internal cylindrical surfaces surrounding a bore in a bearing inner ring. Sleeves with different sizes of bores are provided to fit upon a variety of shaft sizes. Thus, a given size bearing inner ring can fit upon a variety of shaft sizes by using a split sleeve which fits both the bearing ring and the shaft.

A sleeve fastens an inner race ring of an anti-friction bearing to a rotatable shaft. The inner race ring has an axial bore that includes portions at opposite ends of the ring and a central portion located therebetween. The internal cylindrical surfaces surrounding the bore at the end portions of the ring are eccentric with respect to the outer surface of the ring (which is the inner race of the bearing) while the internal cylindrical surface surrounding the central portion of the bore is concentric with the inner and outer surface of the ring. The bore diameter at the central portion is greater than the bore diameter at the end portions. The sleeve has outside cylindrical surfaces that are aligned with the cylindrical surfaces surrounding the central and end portions of the ring bore when the bearing is mounted. Like the inner ring, the central outer surface of the sleeve is centric with respect to the sleeve bore, and end portions of the outer surface of the sleeve are eccentric with respect to the sleeve bore. The sleeve is split longitudinally with an arcuate portion removed to enable the sleeve to be compressed radially for slipping the sleeve axially into the ring bore. Upon release of the compression, the sleeve expands radially so that the central portion of the sleeve positions the sleeve axially in place within the ring bore. Since the outer surface of the central portion of the sleeve is concentric with inner and outer surfaces of the ring (the outer surface of which defines the inner race of the bearing), and since the sleeve bore is concentric with the outer surface of the central portion of the sleeve, the bearing inner ring, when tightened on the shaft by the sleeve, will always be centric relative to the shaft.

To mount the bearing on the shaft, the sleeve, with the ring mounted thereon, slips axially upon the shaft. Angular rotation of the ring relative to the sleeve causes engagement of the eccentric cylindrical surfaces of the sleeve end portions with the eccentric ring end portions to tighten the sleeve about the shaft. The bore openings of the sleeves can be of various sizes to receive various size shafts to adapt one size of bearing ring to any one of the various shaft sizes.

BRIEF DESCRIPTION OF THE DRAWING

FIG. 1 is a longitudinal section of a bearing locking assembly embodying the present invention.

FIG. 2 is a transverse section taken on the line 2—2 of FIG. 1.

FIG. 3 is a transverse section taken on the line 3—3 of FIG. 1.

FIG. 4 is a section corresponding to FIG. 2, with the bearing ring being rotated angularly relative to the sleeve to tighten the sleeve about the shaft.

FIG. 5 is a longitudinal section of the bearing locking assembly, wherein a ring, of the size shown in FIG. 1, is adapted to fit upon a shaft of smaller diameter by reducing the size of the sleeve bore.

DESCRIPTION OF THE PREFERRED EMBODIMENT

Looking now at FIG. 1, an anti-friction bearing 7 has an outer ring 8, an inner ring 11, and a set of intermediate balls 9. An assembly 10 fastens the inner ring 11 centrically to a rotatable shaft 12. The inner ring has a generally cylindrical shape defined by a radius $R_4$ (FIG. 2) about a central axis A, which is the central longitudinal axis of shaft 12. A ball race 13, formed in the outer surface of the inner ring, extends circumferentially about the axial mid-portion of the inner ring. Radial end faces 14 and 15 are provided at opposite ends of the inner ring, and a bore 16 extends through both end faces and the inner ring. Adjacent each radial end face, the bore has a cylindrical end portion 17, 18 with an internal cylindrical surface defined by a radius $R_1$ about an axis B. Axis B is displaced from central axis A of shaft 12 by an amount E. Intermediately of these end portions, the ring bore 16 has a cylindrical central portion 19 with an internal cylindrical surface defined by a radius $R_2$ about the axis A. The radius $R_2$ is greater than the radius $R_1$ plus the eccentricity E. Thus, radial shoulders 20 and 21 are formed between the central portion and the end portions of the ring bore.

The assembly 10 includes the internal configuration of the inner ring 11 adjacent the bore 16 and a sleeve 24 that fits into the bore. This sleeve is split longitudinally, and a circumferential segment is removed, so that the sleeve is resiliently compressible in a radial direction for insertion into the ring bore. The sleeve has an external surface configuration that includes a cylindrical central portion 25, having an axis that is always coincident with the axis A when the sleeve is fitted within the inner ring, and a pair of cylindrical end portions 26, 27, having an axis $B_1$ that is coincident with the axis B of the inner ring bore end portions when the eccentricities thereof are in radial alignment from the axis A. The external cylindrical surface of the sleeve central portion is defined by a radius substantially corresponding to the radius $R_2$ and this radius will thus be given the same reference numeral. The radius $R_2$ is greater than radii $R_3$, that defines the external cylindrical surfaces of the sleeve end portions, plus the eccentricity E. Thus, radial shoulders 28, 29 are formed between the central portion and the end portions of the sleeve. The sleeve portions substantially correspond in axial length to corresponding portions of the ring bore 16. The radius $R_2$ that defines the external cylindrical surface of the sleeve central portion is greater in a non-compressed condition than the radii $R_1$ that defines the internal cylindrical surfaces of the ring bore end portions 17, 18. Thus, the sleeve central portion keys the sleeve longitudinally in place within the inner ring 11.

With reference to FIG. 2, it will be seen that a gap 31 is provided where an arcuate segment has been removed from the sleeve 24. This gap is along the line where the sleeve is split longitudinally. The arcuate length of this gap is sufficient to enable the sleeve to be resiliently compressed radially so that the external cylindrical surface of the sleeve central portion fits through the internal cylindrical surface of the inner ring 11 at the bore end portions 17, 18. These bore end portions have internal cylindrical surfaces defined by the radii $R_1$ about the axis B, which is eccentric to the axis A. The sleeve end portions 26, 27 have external cylindrical surfaces defined by the radii $R_3$ about the axis $B_1$. When the eccentricities of the sleeve and the bore are aligned radially from the axis A, as shown in FIGS. 1 and 2, the external cylindrical surface of the sleeve end portions fit within the internal cylindrical surfaces of the ring bore end portions. The sleeve has a bore 32, defined by an internal radius $R_5$ about the axis A, for receiving the shaft 12.

FIG. 3 shows that the inner periphery of the ring bore central portion 19 is concentric with the inner race ring 11 and that the outside periphery of the sleeve central portion 25 is concentric with the sleeve. When fitted together these central portions are concentric with each other. Since the radius $R_2$ of the sleeve central portion outer surface and the ring bore central portion internal surface are substantially the same and project from a common central axis A when the sleeve is installed within the ring, the outer surface of the central portion of the sleeve is concentric with the inner and outer surfaces of the ring, and since the sleeve bore is concentric with the outer surface of the sleeve central portion, the bearing inner ring, when tightened on the shaft by the sleeve, will always be centric relative to the shaft.

FIG. 4 illustrates that when the sleeve 24 is rotated from the position shown in FIG. 2 to the position shown in FIG. 4, the sleeve eccentric end portions 26, 27 tend to wedge together with the bore eccentric end portions 17, 18 along a theoretical maximum arc of 180°. In this rotated position, the eccentricity $E_1$ of the sleeve is positioned radial from the axis A to the axis $B_1$, while the eccentricity E of the inner ring bore remains between the axes A and B. Thus, frictional engagement of these end portions compresses or wedges the sleeve radially against the inner ring bore sections 17 and 18 respectively, as to tighten the sleeve about the shaft, thereby locking the sleeve and the ring together in axial and radial position for rotation with the shaft.

FIGS. 1 and 5 illustrate that a given size of inner race ring 11 can be used for mounting a variety of shaft sizes. The rings 11 in both figures have the same dimensions, but the shaft 12' in FIG. 5 has a diameter $D_2$ that is smaller than a corresponding diameter $D_1$ of the shaft 12 in FIG. 1. The sleeve 24' of FIG. 5 has a thickness $T_2$ that is greater than the thickness $T_1$ of the sleeve 24. Thus, the only different between the assemblies 10 is the difference in diameter of the sleeve bore 32. Boring the sleeve is a relatively simple operation in comparison to machining the inner race ring and the outer surface of the sleeve.

From the foregoing description, it will be seen that the assembly 10 includes a sleeve 24 that slips axially into a bore 16 of an inner ring 11. The ring and the sleeve slip axially about a shaft 12. Relative angular rotation between the ring, sleeve, and shaft, locks the assembly in axial and radial position for rotation with the shaft. The sleeve distributes the locking pressure from the ring over a wide area of the shaft, thereby eliminating fretting corrosion of the shaft. A given size of ring can be used on a variety of shaft sizes within a given range, thereby reducing the need for costly machining to adapt each bearing to each shaft size.

Although the best mode contemplated for carrying out the present invention has been herein shown and described, it will be apparent that modification and variation may be made without departing from what is regarded to be the subject matter of the invention.

What is claimed is:

1. An assembly for locking an annular machine element, such as an inner race ring of an anti-friction bearing, to a mounting-shaft, said assembly comprising the annular machine element having a bore that includes a continuously cylindrical annular central portion concentric with the element and a pair of cylindrical end portions eccentric with the element, and a unitary split sleeve having a central cylindrical bore sized to fit with an intended mounting-shaft size, said sleeve having an external surface configuration that includes an annular cylindrical central portion concentric with the sleeve bore and a pair of cylindrical end portions eccentric with the sleeve bore, said sleeve central portion having an external cylindrical surface defined by a radius that is greater than the radii defining the external cylindrical surfaces of the eccentric end portions of the sleeve, said sleeve being sized so as to be resiliently compressible in a radial direction to enable insertion of the sleeve into the bore of the annular machine element whereupon release of the radial compressing force keys the central portion of the sleeve within the central portion of the bore to lock the sleeve longitudinally in place within the element, said sleeve eccentric end portions having external cylindrical surfaces that slidably fit within internal cylindrical surfaces of the eccentric end portions of the annular machine element bore when the eccentricities of the sleeve and the bore are aligned radially but upon relative rotation between the element and the sleeve the eccentric portions wedge together to lock the element and the sleeve angularly in place on the mounting-shaft.

2. An assembly for locking an inner race ring of an anti-friction bearing to a mounting-shaft, said assembly comprising the inner race ring having a bore, said bore having a continuously cylindrical annular central portion that is concentric with the ring and a pair of cylindrical end portions that are eccentric with the ring, and a unitary sleeve having a central cylindrical bore sized to fit with an intended mounting-shaft size, said sleeve having an external surface configuration that includes a generally annular cylindrical central portion concentric with the sleeve and a pair of generally cylindrical end portions eccentric with the sleeve, said sleeve central portion having an external cylindrical surface defined by a radius that is greater than the radii defining the external cylindrical surfaces of the eccentric end portions of the sleeve, said sleeve being adapted and sized so as to be resiliently compressible in a radial direction to enable insertion of the sleeve into the bore of the ring whereupon release of the radial compressing force the central portion of the sleeve keys within the central portion of the bore to lock the sleeve longitudinally in place within the ring, said sleeve eccentric end portions having external cylindrical surfaces that slidably fit within internal cylindrical surfaces of the eccentric end portions of the ring bore when the eccentricities of the sleeve and the bore are aligned radially but upon relative rotation between the ring and the sleeve the eccentric portions wedge together and thereby lock the ring and the sleeve in place in an angular position upon the mounting-shaft.

3. In the combination of an inner ring for an anti-friction bearing and a unitary sleeve for locking the ring upon a mounting-shaft, said ring having a bore for receiving the sleeve, said sleeve having a bore sized to fit with the intended mounting-shaft, said sleeve being split longitudinally along a peripheral edge and being resiliently compressible in a radial direction and sized for insertion into the ring bore, the improvement comprising said ring bore having a continuously cylindrical annular central portion that is concentric with the ring and a pair of cylindrical end portions that are eccentric with the ring, said sleeve having an external surface configuration that includes a generally annular cylindrical central portion concentric with the sleeve and a pair of generally cylindrical end portions eccentric with the sleeve, said sleeve central portion having an external cylindrical surface defined by a radius that is greater than the radii defining the external cylindrical surfaces of the eccentric end portions of the ring bore for keying the sleeve against longitudinal movement within the ring, said sleeve eccentric end portions having external cylindrical surfaces that slidably fit within internal cylindrical surfaces of the eccentric end portions of the ring bore when the eccentricities of the sleeve and the bore are aligned radially but upon relative rotation in either direction between the ring and the sleeve the eccentric portions tend to wedge together and thereby lock the ring and the sleeve in an angular position upon the mounting-shaft.

4. The improved combination described in claim 3 wherein the sleeve has the same length as the bearing inner ring.

5. The improved combination described in claim 3 wherein said sleeve has a thickness enabling it to be bored to a variety of bore sizes within a given range to accommodate a corresponding variety of sizes of mounting-shafts.

6. The improved combination described in claim 3 wherein said sleeve has a gap where the sleeve is split longitudinally that has an arcuate length sufficient to enable the sleeve to be radially compressed so that the external cylindrical surface of the sleeve central portion fits within the internal cylindrical surfaces at the eccentric end portions of the inner race ring.

* * * * *